(12) United States Patent
Gonring (10) Patent No.: US 11,661,165 B1
(45) Date of Patent: *May 30, 2023

(54) PCM CONTROLLED CHARGING SYSTEM

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/099,333

(22) Filed: Nov. 16, 2020

Related U.S. Application Data (63) Continuation of application No. 15/943,394, filed on Apr. 2, 2018, now Pat. No. 10,836,462, which is a (Continued)

(51) Int. Cl.
| | |
|---|---|
| *B63H 21/14* | (2006.01) |
| *H02P 9/48* | (2006.01) |
| *H02J 4/00* | (2006.01) |
| *H02P 9/02* | (2006.01) |
| *H02J 7/14* | (2006.01) |
| *B63H 21/21* | (2006.01) |

(52) U.S. Cl.
CPC ............. *B63H 21/14* (2013.01); *H02J 4/00* (2013.01); *H02J 7/1492* (2013.01); *H02P 9/02* (2013.01); *H02P 9/48* (2013.01); *B63H 21/21* (2013.01); *B63H 21/213* (2013.01)

(58) Field of Classification Search
CPC ...... B63H 21/14; B63H 21/21; B63H 21/213; H02J 4/00; H02J 7/1492; H02P 9/02; H02P 9/48

USPC .......................................................... 701/21
See application file for complete search history.

(56) References Cited

U.S. PATENT DOCUMENTS

| | | | |
|---|---|---|---|
| 5,216,350 A | 6/1993 | Judge et al. | |
| 5,264,764 A * | 11/1993 | Kuang ............... | B60L 15/2045 180/65.245 |

(Continued)

FOREIGN PATENT DOCUMENTS

| | | |
|---|---|---|
| CA | 1137347 | 12/1982 |
| DE | 3003907 | 8/1981 |

(Continued)

OTHER PUBLICATIONS

Nigel et al., "Generator Operation of a Switched Reluctance Starter/Generator at Extended Speeds," 2009, vol. 58, Publisher: IEEE.*

(Continued)

*Primary Examiner* — Tuan C To
(74) *Attorney, Agent, or Firm* — Andrus Intellectual Property Law, LLP (57) ABSTRACT

A method of controlling an alternator in a marine propulsion system includes receiving a demand value, wherein the demand value relates to an amount of output power produced by the engine that is demanded for propulsion of the marine vessel, and determining whether the demand value exceeds a demand threshold. The alternator is then controlled to reduce the charge current output to the battery and/or reduce a portion of engine output power from the engine that is utilized by the alternator when the demand value exceeds the demand threshold.

20 Claims, 7 Drawing Sheets

Related U.S. Application Data continuation of application No. 15/403,950, filed on Jan. 11, 2017, now Pat. No. 9,975,619.

(56) References Cited

U.S. PATENT DOCUMENTS

| | | | |
|---|---|---|---|
| 5,460,555 A | 10/1995 | Fukuoka | |
| 5,481,178 A | 1/1996 | Wilcox et al. | |
| 5,524,581 A | 6/1996 | Rush, II | |
| 5,570,001 A | 10/1996 | Fenley | |
| 5,602,459 A | 2/1997 | Rogers | |
| 5,706,783 A | 1/1998 | Sawada | |
| 5,746,270 A | 5/1998 | Schroeder | |
| 5,870,991 A | 2/1999 | Mineno | |
| 5,955,793 A | 9/1999 | Khadkikar | |
| 6,118,237 A * | 9/2000 | Kikuchi | H02J 7/007194 903/905 |
| 6,273,771 B1 | 8/2001 | Buckley et al. | |
| 6,309,268 B1 | 10/2001 | Mabru | |
| 6,414,832 B1 | 7/2002 | Crecelius | |
| 6,452,286 B1 * | 9/2002 | Kubo | B60W 10/08 290/40 C |
| 6,652,330 B1 | 11/2003 | Wasilewski | |
| 6,857,917 B1 * | 2/2005 | Wasilewski | B63H 21/213 440/1 |
| 7,253,573 B2 * | 8/2007 | Iwazawa | B60L 7/16 318/432 |
| 7,503,819 B1 | 3/2009 | Jaeger | |
| 7,812,467 B1 | 10/2010 | Lemancik et al. | |
| 7,941,253 B1 | 5/2011 | Brant | |
| 7,982,435 B2 * | 7/2011 | Masuda | B60K 6/547 320/132 |
| 8,137,146 B2 | 3/2012 | Cohen | |
| 8,616,312 B2 * | 12/2013 | Connolly | B60W 10/26 180/65.265 |
| 9,004,961 B1 * | 4/2015 | French | B63H 20/00 320/125 |
| 9,371,074 B1 | 6/2016 | Luehrsen | |
| 9,545,985 B1 * | 1/2017 | Provost | B63H 20/002 |
| 9,815,539 B1 | 11/2017 | Provost | |
| 9,889,752 B2 | 2/2018 | Zhou | |
| 9,975,619 B1 * | 5/2018 | Gonring | H02J 4/00 |
| 10,116,149 B1 | 10/2018 | Dao | |
| 2005/0009420 A1 | 1/2005 | Yoshida | |
| 2005/0287880 A1 * | 12/2005 | Okuyama | H02J 7/1423 440/1 |
| 2009/0061705 A1 | 3/2009 | Wilatrowski et al. | |
| 2009/0261599 A1 | 10/2009 | Alston et al. | |
| 2010/0147257 A1 * | 6/2010 | Yazaki | F02M 35/168 123/198 E |
| 2010/0174234 A1 | 7/2010 | Werp et al. | |
| 2012/0029749 A1 | 2/2012 | Ulrey | |
| 2012/0083173 A1 | 4/2012 | McMillan | |
| 2013/0109255 A1 * | 5/2013 | Agemura | B63H 21/21 440/1 |
| 2013/0218385 A1 | 8/2013 | Wenger | |
| 2015/0005995 A1 | 1/2015 | Caouette | |
| 2016/0129981 A1 | 5/2016 | Davis | |
| 2016/0218518 A1 * | 7/2016 | Fukuda | H02J 5/00 |
| 2016/0332520 A1 | 11/2016 | Miller | |
| 2017/0028979 A1 * | 2/2017 | Miyashita | B60L 58/25 |
| 2017/0194669 A1 | 7/2017 | Christensen | |
| 2017/0217328 A1 | 8/2017 | Patel | |
| 2018/0172137 A1 * | 6/2018 | Yamazaki | F16H 57/0483 |
| 2019/0074558 A1 | 3/2019 | Masias | |

FOREIGN PATENT DOCUMENTS

| | | | |
|---|---|---|---|
| DE | 19629833 | 1/1998 | |
| EP | 0655037 | 7/1996 | |
| EP | 1074418 A2 * | 2/2001 | B60K 31/00 |
| EP | 1079494 A2 * | 2/2001 | B60K 6/485 |
| EP | 2169819 | 3/2010 | |
| EP | 2353995 A1 * | 8/2011 | B63H 21/20 |
| GB | 2401203 | 11/2004 | |
| GB | 2486320 A * | 6/2012 | B60K 6/46 |
| KR | 20140062648 | 5/2014 | |
| WO | WO 2010042190 | 4/2020 | |

OTHER PUBLICATIONS

Extended European Search Report issued in European Patent Application No. 21208194.7, dated Apr. 19, 2022.

* cited by examiner

PCM CONTROLLED CHARGING SYSTEM

CROSS REFERENCE TO RELATED APPLICATION

This application is a continuation of U.S. patent application Ser. No. 15/943,394, filed Apr. 2, 2018, which is a continuation of U.S. patent application Ser. No. 15/403,950, filed Jan. 11, 2017, which is incorporated herein by reference in entirety.

BACKGROUND

The following U.S. Patents and Applications provide background information and are incorporated herein by reference in entirety.

U.S. Pat. No. 5,481,178 discloses a circuit and method for controlling a switching voltage regulator having (1) a switch including one or more switching transistors and (2) an output adapted to supply current at a regulated voltage to a load including an output capacitor. The circuit and method generates a control signal to turn said one or more switching transistors OFF under operating conditions when the voltage at the output is capable of being maintained substantially at the regulated voltage by the charge on the output capacitor. Such a circuit and method increases the efficiency of the regulator circuit particularly at low average current levels.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,652,330 discloses a method for controlling the electrical system of a marine vessel that comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 7,812,467 discloses a smart alternator control circuit and method limiting alternator load on an internal combustion engine.

U.S. Pat. No. 7,941,253 discloses a marine propulsion drive-by-wire control system controls multiple marine engines, each one or more PCMs, propulsion control modules for controlling engine functions which may include steering or vessel vectoring. A helm has multiple ECUs, electronic control units, for controlling the multiple marine engines. A CAN, controller area network, bus connects the ECUs and PCMs with multiple PCM and ECU buses. The ECU buses are connected through respective isolation circuits isolating the respective ECU bus from spurious signals in another ECU bus.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine propulsion system includes an engine effectuating rotation of an output shaft at an engine output power, a battery, and an alternator having a rotor driven into rotation by the output shaft such that the alternator utilizes a portion of the engine output power to generate a charge current to the battery. The marine propulsion system includes a control system that receives a throttle demand value and determines whether the throttle demand value exceeds a demand threshold. The control system controls the alternator to reduce the charge current output to the battery and reduce the portion of the engine output power utilized by the alternator when the throttle demand value exceeds the demand threshold.

In one embodiment, a method of controlling an alternator in a marine propulsion system includes receiving a battery voltage level of a battery charged by the alternator, receiving a throttle demand value, determining whether the throttle demand value exceeds a demand threshold, and determining whether the battery voltage level exceeds a threshold minimum battery voltage. If the throttle demand value exceeds the demand threshold and the battery voltage level exceeds the threshold minimum battery voltage, then the alternator is controlled to reduce the charge current output to the battery and reduce engine output power utilized by the alternator.

Another embodiment of a marine propulsion system includes an engine effectuating rotation of an output shaft, a battery, an alternator having a rotor driven into rotation by the output shaft, and a temperature sensor that measures a temperature associated with the engine. The marine propulsion system further includes a control system that receives the temperature from the temperature sensor and determines whether the temperature exceeds a temperature threshold. If the temperature threshold is exceeded, then the control system controls the alternator to reduce the charge current output to the battery.

One embodiment of a method of controlling an alternator in a marine propulsion system includes receiving a temperature from a temperature sensor, wherein the temperature is at least one of an intake air temperature, an oil temperature, and a coolant temperature. The method includes determining whether the temperature exceeds a temperature threshold, and controlling the alternator to reduce the charge current output to the battery when the temperature exceeds the temperature threshold.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

As electrical demand in marine vessels increase, larger and larger capacity alternators are being utilized. For example, marine vessels have an ever increasing number of electronic devices for navigation and on-board computing, as well as an ever increasing number of accessory devices that require high current draw, such as stereo systems, large user interface displays, large bilge pumps, as well as electrical outlets to be utilized by passengers on the vessel. These higher capacity alternators provide sufficient charging output to the battery so that the various accessory devices can be operated effectively. However, through extensive experience and research in the relevant field, the inventor has recognized that such large capacity alternators have an unintended consequence of reducing the available horse power output from the engine for driving the propeller to propel the marine vessel. Another problem recognized by the inventor is that the higher capacity alternators produce significant heat that can contribute to overheating of the engine.

In view of his recognition of foregoing problems and challenges, the inventor developed the disclosed marine propulsion system utilizing a method of controlling an alternator based on a demand threshold on the engine and/or based on an engine-related temperature measurement, such as a temperature measurement from a temperature sensor under the cowl. The inventor recognized that the alternator can be controlled to reduce the charging output to the battery, such as turning off the charging output altogether, during peak demand in order to increase the amount of power available to propel the marine vessel.

Figure 2:
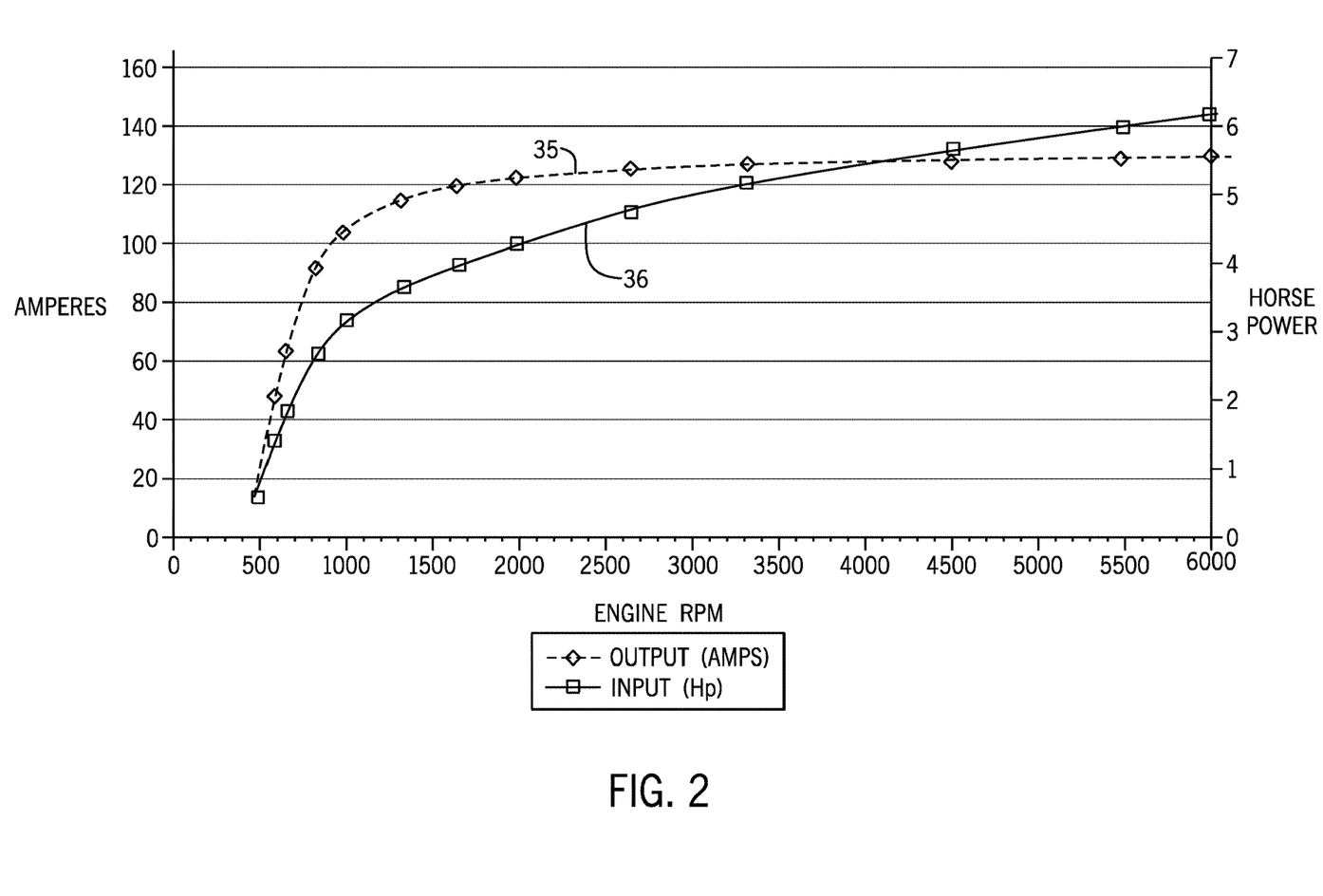
FIG. 2 is a graph depicting horse power consumption and charging current output for an exemplary alternator.

FIG. 2 provides a graph showing a charging output to a battery and a corresponding power consumption for an exemplary alternator. Line 35 depicts an exemplary charging current output from an alternator to a battery based on engine RPM, and specifically charging output in amperes from the exemplary alternator at a range of engine RPM from 500 RPM (exemplary idle setpoint) to about 6,000 RPM (exemplary maximum engine RPM). The dashed line 36 represents a corresponding horsepower consumption of the exemplary alternator at the same range of RPMs. In the depicted example, the alternator consumes approximately 0.5 horsepower at idle and consumes about 6.25 horsepower at maximum engine RPM.

The inventor has recognized that some or all of the horsepower consumed by the alternator could be better utilized during peak power demand to allow more power to be delivered to the propeller, such as during heavy acceleration demand or when operating at wide open throttle. This may be especially valuable at higher engine RPMs, where an increasing amount of horse power is consumed with little gain in charging output to the battery. Accordingly, the inventor developed an alternator control algorithm that utilizes throttle demand values, such as throttle lever position or engine RPM setpoint, as control inputs to reduce the horsepower consumed by the alternator during peak demand times. For example, if maximum power output is being requested by the operator, such as during hard acceleration or maximum throttle demand, the voltage setpoint for controlling the alternator can be reduced resulting in less load on the engine from the alternator and more power available to propel the marine vessel. Such control may be provided based on the throttle demand from the operator, as well as based on a battery voltage level of the battery. For example, if the battery voltage level drops below a threshold minimum battery voltage during a high power demand event, the voltage setpoint for controlling the alternator may be gradually increased to maintain the battery voltage at or above the threshold minimum battery voltage. When the power demanded by the operator decreases, such as below a demand threshold, the voltage setpoint may be gradually increased back to its normal state. Alternatively or additionally, the voltage setpoint for controlling the alternator may be reduced for a period of time upon detection of a high throttle demand from the operator, and thus the alternator may return to normal operation after expiration of the predetermined period of time.

Additionally, the inventor also recognized that the alternator can be controlled to increase performance and engine protection functions by allowing the alternator output to be reduced when the under-cowl temperature conditions are high such that additional heat outputted by the alternator can have deleterious effects. Accordingly, the inventor also developed an alternator control algorithm utilizes temperature measurement, such as engine temperature or air temperature to control the alternator to reduce the alternator output when the temperatures are above an acceptable threshold temperature, thereby to create less heat from the alternator during high under-cowl ambient conditions.

Figure 1:
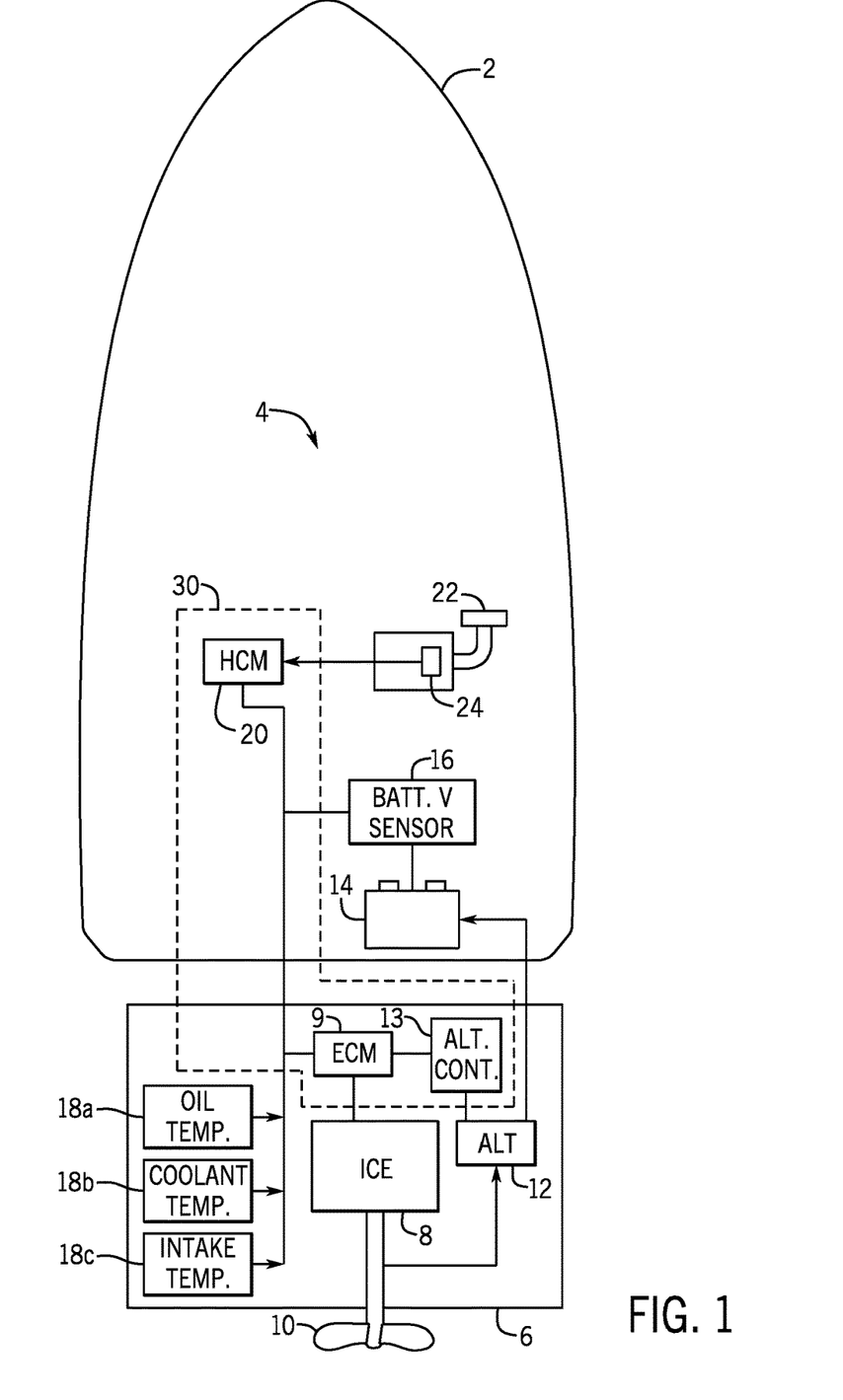
FIG. 1 is a schematic diagram of a marine propulsion system according to one embodiment of the present disclosure.

FIG. 1 depicts an exemplary embodiment of a marine propulsion system 4 configured to provide the alternator control functionality described herein. In the depicted embodiment, a propulsion device 6 propels the marine vessel 2. While the propulsion device 6 is depicted as an outboard motor, in other embodiments the propulsion device 6 may be any device that propels the marine vessel, such as an inboard drive, inboard/outboard drive, stern drive, jet drive, or the like. The propulsion device 6 includes an engine 8, such as an internal combustion engine, and an engine control module (ECM) 9 that monitors and controls the engine 8. The engine 8 drives rotation of the propulsor 10, such as a propeller or impeller, in order to propel the marine vessel 2 through the water. The propulsion device 6 further includes one or more temperature sensors 18, which in the depicted embodiment include an oil temperature sensor 18a, coolant temperature sensor 18b, and intake air temperature sensor 18c sensing the temperature of the air entering the intake manifold of the engine 8.

In addition to driving the propulsor 10 to propel the marine vessel 2, the engine 8 output also drives the alternator 12 which converts the rotational motion outputted by the engine 8 into electrical energy to charge the battery 14, which in turn powers the engine (such as at startup) as well as other accessory devices described above. For example, the crank shaft of the engine 8 may drive the rotor of the alternator 12, e.g., by a pulley belt, to generate electrical energy for charging the battery and/or for use by the engine 8. As is typical, the alternator has a stator supplying output power through output diodes. Some of the output power is supplied back to the alternator in order to generate a field current, enabling generation of electrical energy upon rotation of the rotor. Accordingly, the alternator causes a load on the engine that absorbs horsepower from the engine output, as depicted in FIG. 2. In general, the greater the engine RPM, the faster that the rotor is turned and thus the greater the amount of horsepower utilized by the alternator 12. Therefor, the alternator 12 outputs more output current to charge the battery 14 at higher engine RPMs. However, the load on the engine also correlates to the field current, and thus reducing the field current also reduces the amount of engine output power consumed by the alternator.

The alternator 12 is controlled by an alternator controller 13, which may provide digital and/or analog control of the alternator. In one embodiment, the alternator controller 13 may be a smart alternator control circuit responsive to the ECM 9 and/or the helm control module (HCM). The alternator controller 13 controls the amount of load that the alternator 12 puts on the engine 8 by limiting the charge current output to the battery 14 from the alternator 12. Specifically, the alternator controller 13 limits the load imposed by the magnetic field on the rotor by reducing the field current supplied as feedback to the alternator 12. Thereby, the amount of horsepower absorbed by the alternator 12 is reduced, as is the charge current outputted by the alternator 12. The alternator controller 13 is typically configured to control the alternator 12 based on the voltage level of the battery 14, such as the voltage measured by battery voltage sensor 16. For example, the alternator controller 13 may be configured to maintain the battery voltage level within a predetermined amount of a voltage setpoint.

The propulsion system 4 further includes one or more propulsion control devices, such as a throttle lever 22 utilized to control the speed of the marine vessel 2. As is standard, the throttle lever 22 is movable in a forward direction to increase the speed of the marine vessel. A lever position sensor 24 senses a position of the throttle lever 22 and communicates the position to a control module, which in the depicted embodiment is a helm control module (HCM) 20. The throttle lever 22 is movable between a neutral position (such as commanding that a gear system of the propulsion device 6 is in neutral) and a full throttle forward position. This range of motion of the throttle lever 22 may be expressed as a percentage, for example, between 0% associated with the neutral position and 100% associated with the full forward throttle position of the throttle lever 22.

Accordingly, an operator provides a throttle demand input to the system by moving the throttle lever 22. A high throttle demand may be determined by comparing the position of the throttle lever 22 to a threshold throttle position requiring high horsepower output, such as higher than the available horsepower output when the alternator 12 is consuming a significant amount of horsepower. For example, the demand threshold may be a threshold lever position, such as a throttle lever position above 90% or above 95%. In other embodiments, the demand threshold may be set higher or lower depending on the overall configuration of the system 4.

Alternatively or additionally, the demand threshold may be defined as a threshold increase in throttle lever position. For example, if the operator moves the throttle lever 22 forward rapidly, demanding quick acceleration of the marine vessel 2, the portion of the engine output power utilized by the alternator may be reduced in order to divert more horsepower to accelerating the marine vessel 2. Accordingly, the demand threshold may be a threshold increase in the position of the throttle lever 22 in a given amount of time, above which the output of the alternator 12 is reduced. For example, the helm control module 20 may determine the derivative, or change, between two or more consecutive throttle lever positions measured by the lever position sensor 24 to determine a rate of change of the throttle lever 22. That rate of change may be compared to a threshold rate of change in order to determine whether the throttle demand value exceeds the demand threshold. To provide just one example, the demand threshold may be 50% of the total forward throttle range (between 0% and 100% forward throttle lever position) per second. If the throttle demand exceeds the threshold, then the alternator 12 is controlled as described herein.

In other embodiments, the throttle demand value may be some other value associated with the throttle demanded by the operator, or by an autopilot control module controlling propulsion of the marine vessel 2. For example, the throttle demand value may be an engine RPM setpoint associated with the throttle lever 22 position and/or determined by an autopilot system. Likewise, the demand threshold may be an engine RPM setpoint value against which the demand threshold engine RPM setpoint can be compared. Similarly, the demand threshold may be a threshold increase in engine RPM setpoint. In such an embodiment, a change in engine RPM setpoint over a predetermined time period may be calculated. If a sudden acceleration is demanded then the change in engine RPM setpoint will suddenly increase. If the increase in engine RPM setpoint exceeds the threshold, then the alternator reduction strategy described herein will be employed.

In still other embodiments, the throttle demand value and corresponding demand threshold may be any other value representing the demand on the engine 8, such as engine load, the amount of output power demanded, percent of available power demanded, or the like.

The alternator control strategy is implemented by a control system on the marine vessel 2 which may include one or more control modules or other control circuitry. In the depicted embodiment, the control system 30 includes the HCM 20, ECM 9, and alternator controller 13. The HCM 20, alternator controller 13, and ECM 9 are communicatively connected such that control signals can be communicated therebetween. For example, the control modules 20, 13, 9 of the control system 30 may be operating as a CAN network, such as exemplified in U.S. Pat. No. 6,273,771. In other embodiments, the modules in the control system 30 may operate as a Local Interconnect Network (LIN) bus. In still other embodiments, communication between the ECM 9 and HCM 20 may be via CAN bus protocols, and communication to the alternator controller 13 from the other control modules 9, 20 may be via a LIN bus communication protocol (for example). In still other embodiments, the control modules within the control system 30 may communicate via wireless communication, which may be by any of various available wireless communication protocols.

The systems and methods described herein may be implemented with one or more computer programs executed by one or more processors, which may all operate as part of a single control system 30, or even a single control module comprising the control system 30. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As used herein, the term control module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Figure 3:
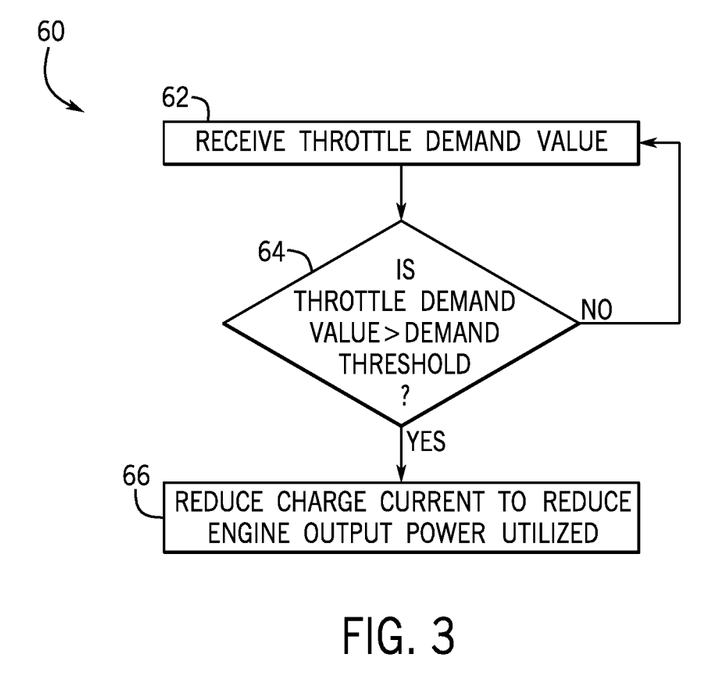
FIGS. 3-7 depict various embodiments of methods of controlling an alternator in a marine propulsion system.
Figure 4:
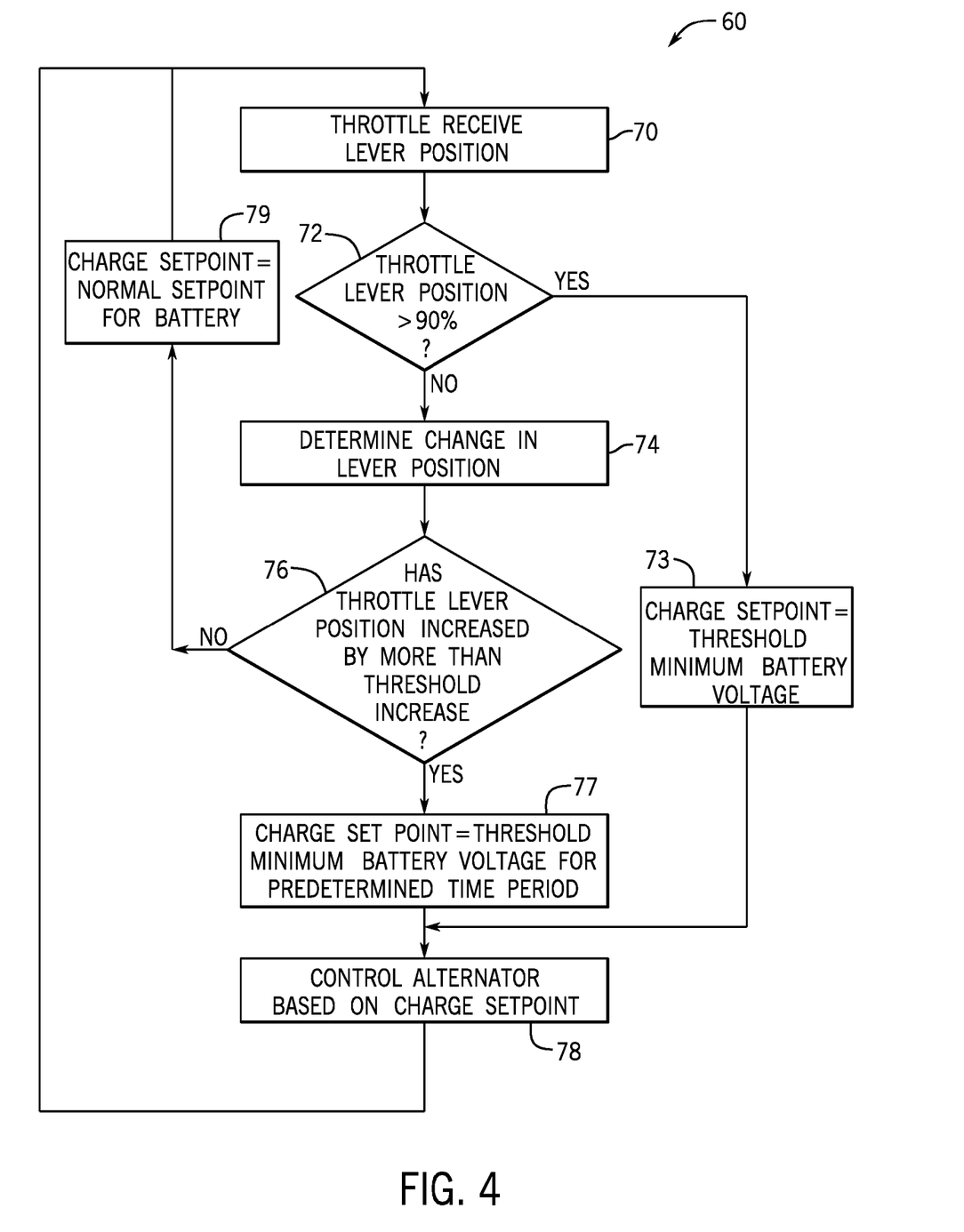
Figure 5:
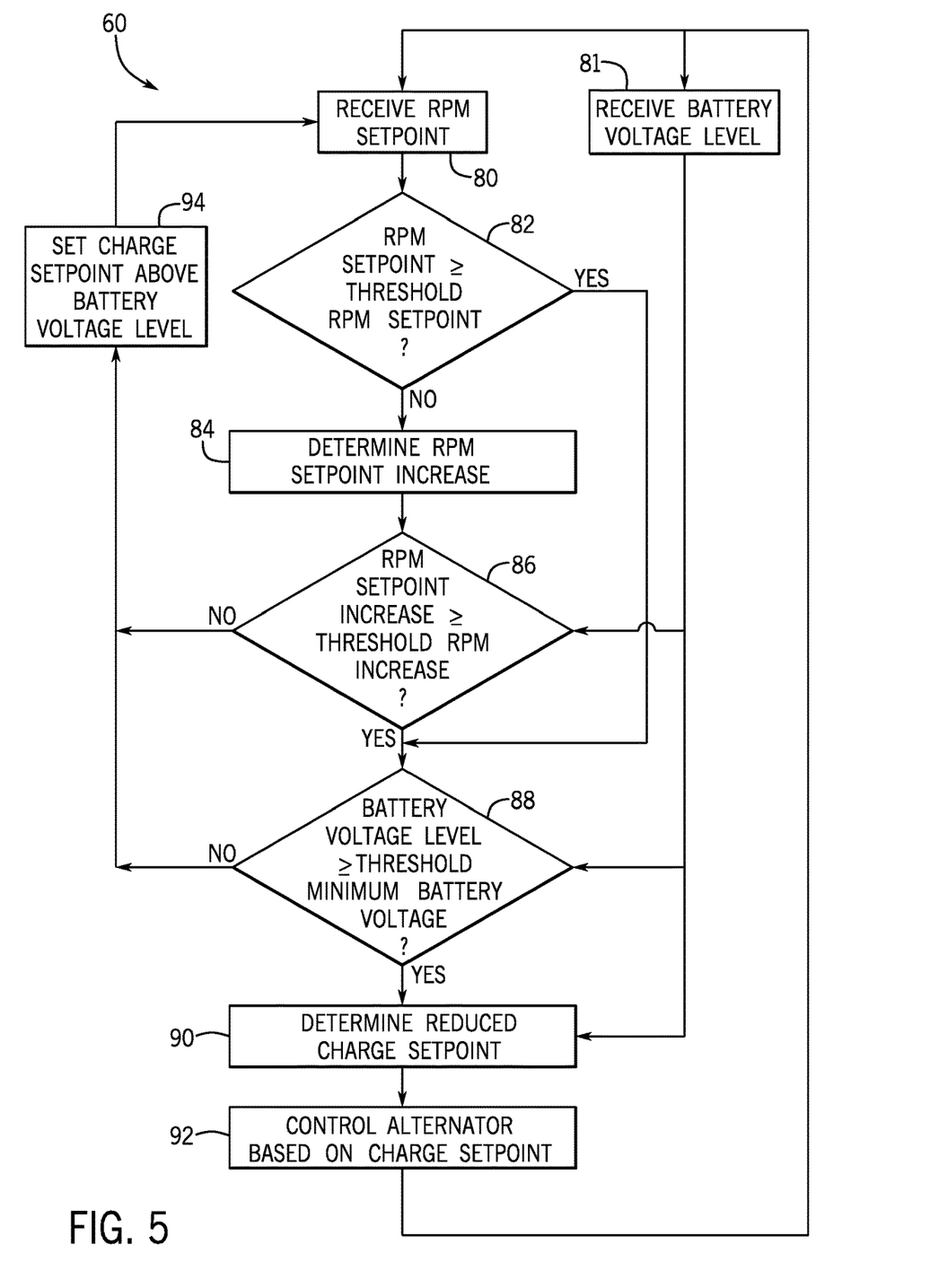

FIGS. 3-7 represent various embodiments of a method 60 of controlling an alternator 12 to reduce engine output power utilized by the alternator when the throttle demand value exceeds the demand threshold. FIGS. 3-5 provide exemplary embodiments of methods 60 of controlling the alternator 12 based on throttle demand value. In FIG. 3, a throttle demand value is received at step 62. Steps are executed at step 64 to determine whether the throttle demand value exceeds the demand threshold. If not, then no action is taken and the throttle demand value continues to be monitored. Once the throttle demand value exceeds the demand threshold, the charge current outputted from the alternator 12 is reduced at step 66 to reduce the engine output utilized by the alternator 12. Exemplary embodiments of the method depicted at FIG. 3 are provided at FIGS. 4 and 5.

Figure 6:
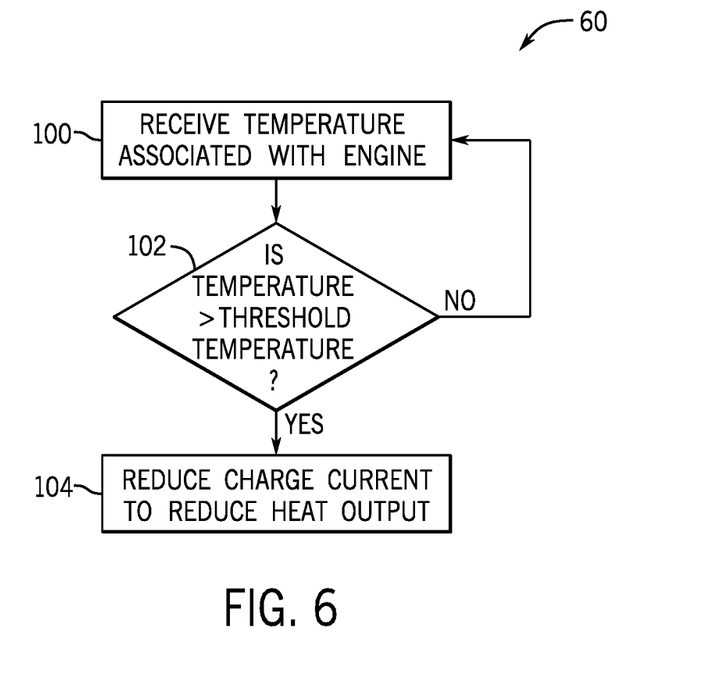
Figure 7:
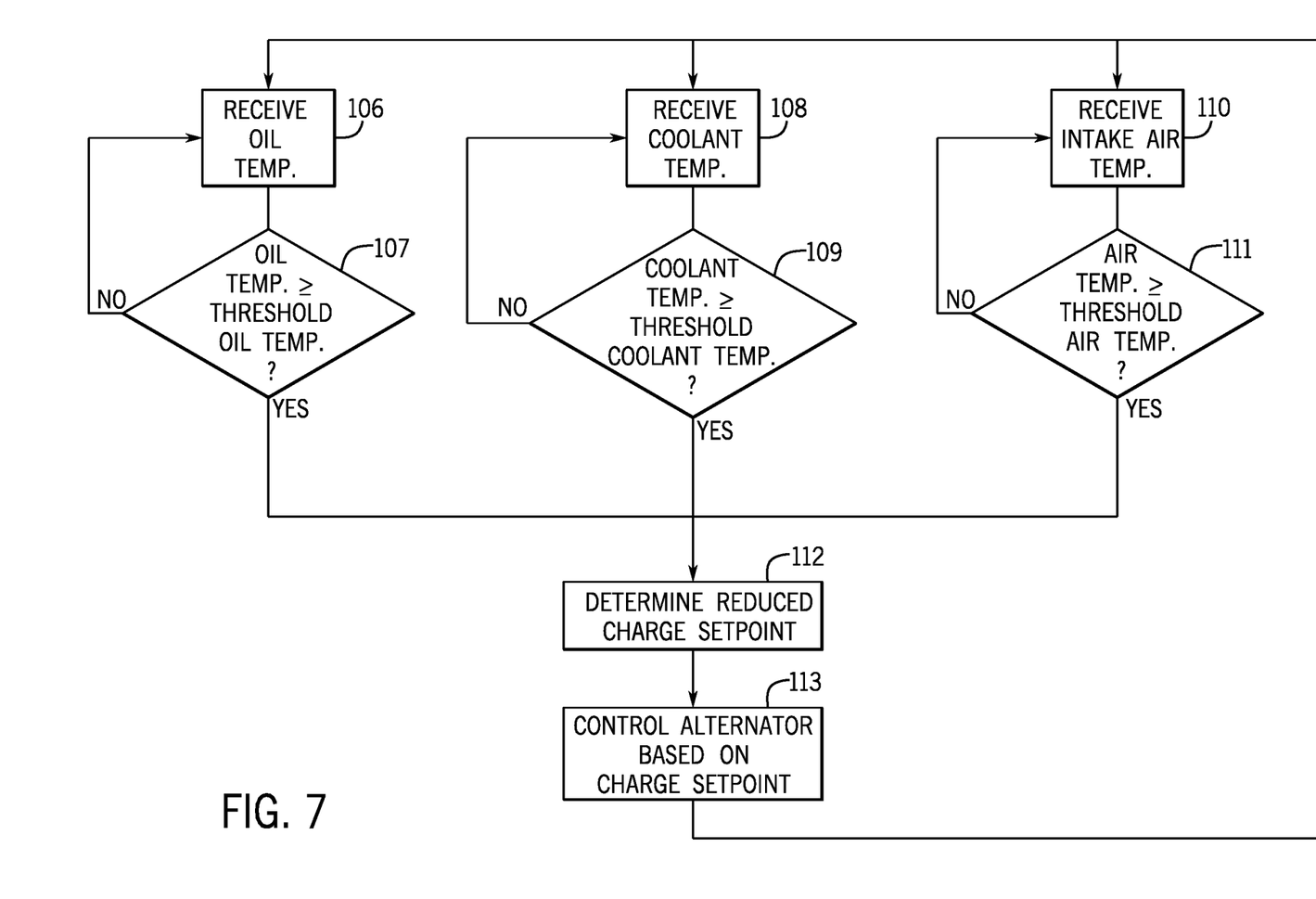

FIG. 6 provides another exemplary method 60 of controlling an alternator in a marine propulsion system 4. A temperature associated with the engine is received at step 100 and is compared to a threshold temperature at step 102. If the threshold temperature is exceeded, then the charge current outputted by the alternator 12 is reduced at step 104 to reduce heat output by the alternator. For example, the field current supplied to the alternator 12 may be reduced to zero, thereby reducing the charge current outputted by the alternator 12 to zero and significantly reducing the heat generated by the alternator 12. FIG. 7 depicts another embodiment of the method generally depicted and described at FIG. 6.

The methods depicted at FIGS. 3-7 are carried out by the marine propulsion system 4 according to instruction generated by the control system 30. As described above, the control system 30 may include one or more control modules comprising executable instructions that carry out the steps described herein. In various embodiments of the control system 30, the instructions may be variously divided among one or more control modules, which in the depicted exemplary embodiment include the ECM 9, HCM 20, and alternator controller 13.

FIG. 4 depicts an embodiment of a method 60 of controlling an alternator 12 in the marine propulsion system 4 based on throttle demand. A throttle lever position is received at step 70. For example, a position measurement may be received by the HCM 20 from the lever position sensor 24 associated with the throttle lever 22. The throttle lever position is compared to a threshold throttle lever position at step 72, which in the depicted embodiment is 90%. If the threshold throttle lever position is greater than 90%, then step 73 is executed to reduce the charge setpoint by setting the charge setpoint equal to a threshold minimum battery voltage. Namely, the setpoint for controlling the battery voltage is set at a threshold minimum causing the alternator to reduce its charge current output, perhaps to zero, until such time as the battery voltage level reaches the threshold minimum battery voltage. The method then continues to step 78.

If the throttle lever position does not exceed the 90% demand threshold at step 72, then a change in lever position is determined at step 74. For example, the current throttle lever position received at step 70 may be compared to one or more previously-received throttle lever positions to determine an amount that the throttle lever position has changed and/or a rate of change. Instructions are executed at step 76 to determine whether the throttle lever position has increased by more than the threshold increase. Similarly, instructions may be executed to determine whether the rate of change of the throttle lever exceeds a threshold rate of change in the positive, accelerating, direction. If the threshold increase is not exceeded at step 76 then the control system 30 executes step 79, where the charge setpoint is set equal to the normal charge set point for the battery, and thus the alternator 12 resumes or continues its normal charging operation. The system then returns to step 70 to continue to monitor the throttle lever position.

If the threshold throttle lever is exceeded, then steps are executed at step 77 to make the charge setpoint equal to the threshold minimum battery voltage. In the exemplary embodiment, the charge set point is made equal to the threshold minimum battery voltage for a predetermined period of time. For example, the predetermined period of time may be a preset time period that correlates with the amount of time estimated for the engine RPM to reach the demanded engine RPM—namely, for the marine vessel to reach the demanded speed corresponding to the throttle lever position. For example, the predetermined time period may be determined by accessing a lookup table of time periods based on the throttle lever position increase. In another embodiment, the predetermined time period may be a single set time period for which the alternator is turned off in order to divert additional horsepower to the propeller during the initial period of acceleration. The alternator is then controlled based on the charged setpoint. Accordingly, the charge current output from the alternator 12 to the battery 14 is reduced until such time as the predetermined time period has expired, the battery voltage level reaches the threshold minimum battery voltage, or the throttle demand no longer exceeds the relevant thresholds.

FIG. 5 depicts another embodiment of a method 60 of controlling an alternator 12 in a marine propulsion system 4. An RPM setpoint is received at step 80, such as an RPM setpoint associated with the current position of the throttle lever 22 as measured by the lever position sensor 24. For example, the position may be received by the HCM 20 from the lever position sensor 24, and the HCM may determine the engine RPM setpoint associated with the received throttle lever position. A battery voltage level is also received at step 81, such as from the battery voltage sensor 16. Instructions are executed at step 82 to determine whether the engine RPM setpoint received at step 80 is greater than or equal to the demand threshold, which is a threshold RPM setpoint. To provide just one example, the threshold engine RPM setpoint could be a value equal to 90% of the maximum RPM of the engine 8. If the threshold engine RPM setpoint is exceeded then the system continues to step 88.

If not, then instructions are executed at step 84 to determine an engine RPM setpoint increase, such as by comparing the received engine RPM setpoint to previously-received engine RPM setpoints. The engine RPM setpoint increase is then compared to a threshold engine RPM increase at step 86. If the demand threshold is exceeded then the system continues to execute step 88. If the demand threshold is not exceeded then the charge setpoint is set to a value that is greater than the battery voltage level, such as to the normal setpoint for maintaining the battery 14. The control system 30 then continues to monitor the engine RPM setpoint to see if the aforementioned thresholds are exceeded.

At step 88, instructions are executed to determine whether the battery voltage level received at step 81 from the battery voltage sensor 16 exceeds a threshold minimum battery voltage. The threshold minimum battery voltage threshold is a setpoint below which the charge current output of the alternator 12 to the battery 14 will not be reduced in order to divert horsepower to turning the propulsor 10. To provide just one example, the threshold minimum battery voltage may be set to 12 volts. Preferably, the threshold minimum battery voltage is a value above the amount of battery power needed to start the engine 8, such as if the engine were to stall or be turned off during the execution of this method. If the battery voltage is not greater than the threshold minimum battery voltage, then step 94 is executed to set the charge setpoint above the battery voltage level, thus to provide a charge current output from the alternator 12 to charge the battery 14.

Assuming that the battery voltage level is greater than the threshold minimum battery voltage, then a reduced charge setpoint is determined at step 90. In various embodiments, the reduced charge setpoint may be a predetermined value, such as the threshold minimum battery voltage or zero volts, or it may be a value determined based on the battery voltage level and/or the throttle demand value. For example, the reduced charge setpoint may be established based on the magnitude of the throttle demand value and/or the difference between the throttle demand value and the demand threshold. For example, if the throttle demand value well exceeds the demand threshold then the charge setpoint might be set low, such as to the threshold minimum battery voltage or to zero volts. Conversely, if the throttle demand value barely exceeds the threshold, the reduced charge setpoint might be set at or below the current battery voltage level received at step 81. In that situation, the charging output of the alternator 12 would be reduced or eliminated briefly, but would soon resume once the battery charge level decreased a bit. In still other embodiments, the reduced charge set point may be set to a predetermined amount below the current battery voltage level. The alternator 12 is then controlled based on the charge setpoint based on step 92. For example, the charge setpoint may be determined at either the ECM 9 or the HCM 20, and then communicated to the alternator controller 13, which controls the alternator based on the received charged setpoint.

FIGS. 6 and 7 depict an embodiment of the method 60 for controlling the alternator 12 based on temperature under the cowl. FIG. 6 is discussed above. In the embodiment depicted in FIG. 7, three different temperature values are received and compared to respective threshold temperatures. Oil temperatures are received at step 106, such as from oil temperature sensor 18*a*. The oil temperature is then compared to a threshold oil temperature at step 107. Coolant temperature is received at step 108, such as from coolant temperature sensor 18*b*, and then compared to a threshold coolant temperature at step 109. Intake air temperature is then received at step 110, such as from intake temperature sensor 18*c*, and then compared to a threshold intake air temperature at step 111. If any of the threshold oil temperature, threshold coolant temperature, or threshold intake air temperature is exceeded, then a reduced charge setpoint is determined at step 112. As described above, the reduced charge setpoint may be a predetermined setpoint value, or it may be determined based on the offending temperature measurement and/or the current battery voltage level. In one embodiment, the reduced charge setpoint may be set equal to zero volts, such as to turn off the field current delivered to the alternator 12 and minimize the heat generated by the alternator activity. Thereby, the alternator will not contribute to the high under-cowl temperature. The alternator is then controlled based on the charge setpoint at step 113.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

The invention claimed is:

1. A marine propulsion system comprising:
   an engine effectuating rotation of an output shaft at an engine output power;
   a battery;
   an alternator having a rotor driven into rotation by the output shaft such that the alternator utilizes at least a portion of the engine output power to generate a charge current to the battery;
   a control system configured to:
      receive a demand value;
      determine whether the demand value exceeds a demand threshold; and
      control the alternator to reduce the charge current output to the battery and/or reduce the engine output power utilized by the alternator when the demand value exceeds the demand threshold.

2. The marine propulsion system of claim 1, wherein the demand value relates to an amount of output power demanded for propulsion of a marine vessel.

3. The marine propulsion system of claim 2, wherein the demand value is a throttle demand value associated with a throttle demanded.

4. The marine propulsion system of claim 3, wherein the throttle demand value is a lever position of a throttle lever, and the demand threshold is at least one of a threshold throttle lever position and a threshold increase in throttle lever position.

5. The marine propulsion system of claim 1, further comprising a battery charge sensor that determines a battery charge level, and wherein the control system is further configured to control the alternator to reduce the charge current output to the battery and/or reduce the portion of the engine output power utilized by the alternator when the demand value exceeds the demand threshold and the battery charge level exceeds a threshold minimum battery charge level.

6. The marine propulsion system of claim 5, wherein the control system is further configured to control the alternator to reduce the charge current output to the battery and/or the portion of the engine output power utilized by the alternator until the demand value no longer exceeds the demand threshold or the battery charge level is less than the threshold minimum battery charge level.

7. The marine propulsion system of claim 1, wherein the control system is further configured to control the alternator to reduce the charge current output to the battery and/or reduce the portion of the engine output power utilized by the alternator for a predetermined amount of time.

8. The marine propulsion system of claim 1, wherein the control system is further configured to control the alternator to reduce the charge current output to the battery and/or reduce the portion of the engine output power utilized by the alternator until the demand value no longer exceeds the demand threshold.

9. The marine propulsion system of claim 1, wherein the demand value is position of a throttle lever and wherein the demand threshold includes at least one of a threshold throttle lever position or a threshold increase in throttle lever position.

10. The marine propulsion system of claim 1, wherein the demand value is an RPM setpoint and the demand threshold includes at least one of a threshold engine RPM setpoint and a threshold increase in engine RPM setpoint.

11. A method of controlling an alternator in a marine propulsion system on a marine vessel, the marine propulsion system having an engine the method comprising:
receiving a demand value, wherein the demand value relates to an amount of output power produced by the engine that is demanded for propulsion of the marine vessel;
determining whether the demand value exceeds a demand threshold; and
controlling the alternator to reduce a charge current output to a battery and/or reduce a portion of engine output power from the engine that is utilized by the alternator when the demand value exceeds the demand threshold.

12. The method of claim 11, further comprising:
receiving a battery charge level of a battery charged by the alternator and comparing the battery charge level to a threshold minimum battery charge level; and
prior to reducing the charge current output to the battery and/or reducing a portion of engine output power from the engine that is utilized by the alternator, determining that the battery charge level exceeds the threshold minimum battery charge level.

13. The method of claim 12, wherein the battery charge level is a battery voltage level and the threshold minimum battery charge level is a threshold minimum battery voltage level.

14. The method of claim 11, wherein controlling the alternator to reduce the charge current output to the battery and/or reduce a portion of engine output power from the engine that is utilized by the alternator includes communicating the reduced charge current output to an alternator controller.

15. The method of claim 14, wherein the reduced charge current output is determined based on a battery charge level.

16. The method of claim 14, wherein the reduced charge current output is determined based on the demand value.

17. The method of claim 14, wherein the reduced charge current output is equal to a predetermined setpoint value.

18. The method of claim 11, wherein the demand value is a lever position of a throttle lever, and the demand threshold is at least one of a threshold throttle lever position and a threshold increase in throttle lever position.

19. The method of claim 11, wherein the demand value is an RPM setpoint and the demand threshold includes at least one of a threshold engine RPM setpoint and a threshold increase in engine RPM setpoint.

20. The method of claim 11, furthering comprising controlling the alternator to reduce the charge current output to the battery and/or reduce the portion of the engine output power utilized by the alternator until the demand value no longer exceeds the demand threshold or a battery charge level is less than a threshold minimum battery charge level.

\* \* \* \* \*

UNITED STATES PATENT AND TRADEMARK OFFICE
CERTIFICATE OF CORRECTION

PATENT NO. : 11,661,165 B1
APPLICATION NO. : 17/099333
DATED : May 30, 2023
INVENTOR(S) : Steven J. Gonring It is certified that error appears in the above-identified patent and that said Letters Patent is hereby corrected as shown below:

In the Claims

Claim 20, Column 12, Line 30, delete "furthering" and substitute therefor -- further --.

Signed and Sealed this
Twenty-seventh Day of June, 2023

Katherine Kelly Vidal
*Director of the United States Patent and Trademark Office*